B. W. WARNER.
Stave-Machines.
No. 140,101.
Patented June 17, 1873.
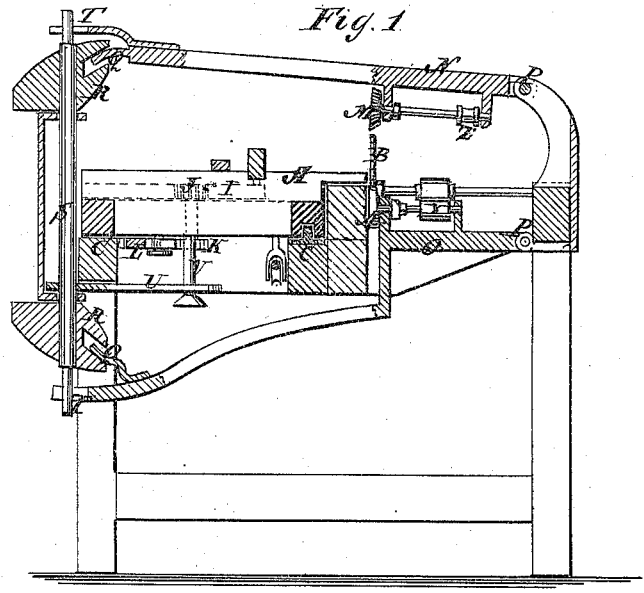
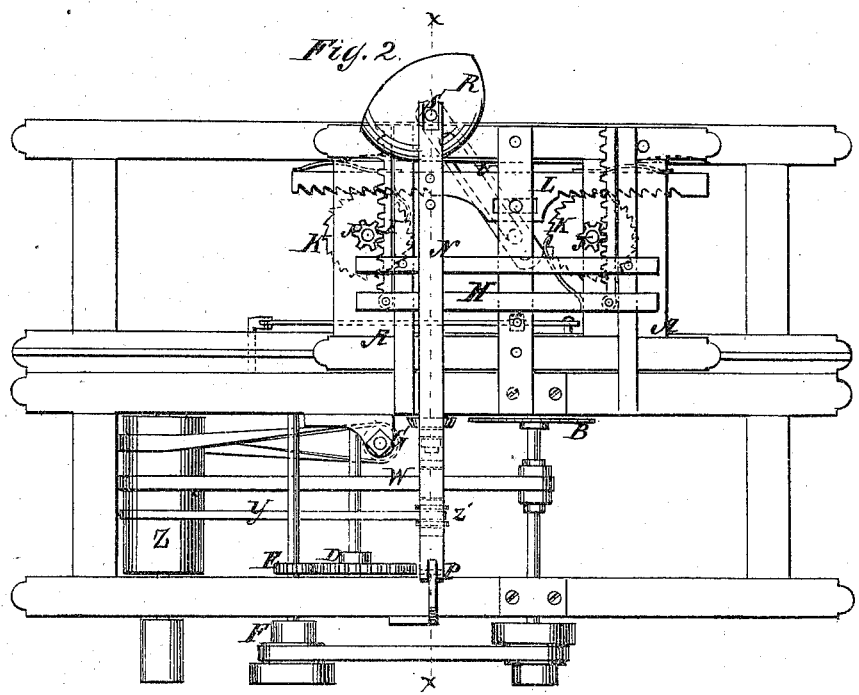

UNITED STATES PATENT OFFICE.

BENJAMIN W. WARNER, OF ROME, NEW YORK, ASSIGNOR TO HIMSELF AND ALBERT E. SMITH, OF UTICA, NEW YORK.

IMPROVEMENT IN STAVE-MACHINES.

Specification forming part of Letters Patent No. 140,101, dated June 17, 1873; application filed March 22, 1873.

*To all whom it may concern:*

Be it known that I, BENJAMIN W. WARNER, of Rome, in the county of Oneida and State of New York, have invented a new Improvement in Stave-Machines, of which the following is a specification:

My invention consists of a pair of tapering and beveling cutters for tapering and beveling the edges of the stave, combined with the apparatus for sawing the staves from the bolts, and planing the sides in such manner as to bevel and taper the edges at the same time that the staves are sawed.

Figure 1 is a transverse sectional elevation of my improved machine, taken on the line $x$ $x$ of Fig. 2. Fig. 2 is a plan view.

Similar letters of reference indicate corresponding parts.

A represents the carriage on which the board to be sawed is moved to the saw B, which cuts the stave from the bolt. Said carriage moves on the ways C, and is worked by the feed-gear D, E, F, in the ordinary manner of working such carriages. G is a vertical planing-tool for dressing the side of the stave while being cut off from the bolt by the saw B. H is the beam to which the bolt is attached and pushed forward to be set to the saw. I represents two of the rack-bars; J, pinions; K, ratchet-wheels; and L the ratchet-bar for feeding the bolt up to the saw. M represents the tapering and beveling edge-cutters, which I propose to use in combination with this sawing and dressing machine for tapering and beveling staves ready for setting up in the barrel. The upper one is mounted on a bar, N, and the lower one on a bar, O; these bars are pivoted to the frame at P, and at their free ends connected, by an arm, Q, with oscillating grooved cams R mounted on the vertical rock-shaft S, and the slotted ends T are fitted on said shaft so as to rise and fall in it. The cam grooves are so shaped that by a quarter turn, or thereabout, the cutters M M will be gradually moved from each other while the stave is passing them from the end to the middle, and then be moved toward each other while the stave is passing them from the middle to the other end, so as to produce the swell of the stave between the ends for forming the bulge of the barrel. The edges of the cutters are beveled to produce the beveled edges of the stave. The shaft S has a slotted-arm, U, in which a rod, V, suspended from the carriage works to impart the oscillating movement. The lower cutter M is worked by the belt W, which drives the saw B acting on its pulley. The upper one is worked by a belt, $y$, from the drum $z$, acting on its pulley $z'$.

Having thus described my invention, I claim as new and desire to secure by Letters Patent—

1. The combination of the oscillating supports N O, cams R, rock-shaft S, slotted-arm U, and stud-bolt V, with a carriage, A, and the beveling and tapering cutters M, substantially as described.

2. The arrangement of bars Q and slotted ends T, of the supports N and O, with the rock-shaft S, and the cams R, as described.

BENJAMIN W. WARNER.

Witnesses:
   D. W. ROWLAND,
   H. F. FOUNTAIN.